(12) United States Patent
Thibaux

(10) Patent No.: US 9,727,533 B2
(45) Date of Patent: Aug. 8, 2017

(54) DETECTING ANOMALIES IN A TIME SERIES

(71) Applicant: Facebook, Inc., Menlo Park, CA (US)

(72) Inventor: Romain J. Thibaux, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 546 days.

(21) Appl. No.: 14/282,902

(22) Filed: May 20, 2014

(65) Prior Publication Data

US 2015/0339265 A1    Nov. 26, 2015

(51) Int. Cl.
*G06F 17/18* (2006.01)
*G06K 9/00* (2006.01)
*G06K 9/62* (2006.01)

(52) U.S. Cl.
CPC ......... *G06F 17/18* (2013.01); *G06K 9/00536* (2013.01); *G06K 9/6284* (2013.01)

(58) Field of Classification Search
CPC ... G06F 17/18; G06K 9/00536; G06K 9/6284
USPC ..... 702/189, 79, 182, 185, 193, 85, 89, 103, 702/179, 181; 703/2
See application file for complete search history.

(56) References Cited

U.S. PATENT DOCUMENTS 7,346,471 B2 * 3/2008 Chickering ........ G06K 9/00503
702/181
8,577,649 B2 * 11/2013 Suyama ............ G05B 23/0232
703/2

* cited by examiner

*Primary Examiner* — John H Le
(74) *Attorney, Agent, or Firm* — Perkins Coie LLP

(57) ABSTRACT

Embodiments are disclosed for detecting anomalies in time series using statistical models. In some embodiments, a linear regression model is built for the time series for predicting future values of the time series. Furthermore, the standard deviation of the difference between a prediction and an ideal value of the time series at any point is then estimated. An anomaly is detected when the difference between the prediction and the observed value is greater than a certain threshold based on the estimated standard deviation.

18 Claims, 4 Drawing Sheets

DETECTING ANOMALIES IN A TIME SERIES

TECHNICAL FIELD

This patent application generally relates to detecting anomalies in a time series, and more specifically, to determining whether an apparent anomaly is a true anomaly or a modeling consequence of a previous anomaly.

BACKGROUND

In today's "information age," numerous computing systems produce, collect and/or store vast amounts of data at lightning speed. Some types of data collected by a computing system during a specific period time may follow a similar pattern as data collected during earlier time periods. For example, when large amounts of data are collected based on user behavior over several days or weeks, data collected today may follow a similar pattern as data collected in the past. Therefore, time series data produced by a system may be analyzed to build models to extract patterns and predict future data. For example, the number of "likes" that are expected to be processed by a social network on a particular day may correlate with the number of "likes" that were processed on one or more previous days. A computing system may employ predictions to allocate computing resources, e.g., processors, memory, storage, etc., so that processing data does not exceed a particular threshold. For example, in response to a prediction that the system will process a large volume of data on a future day, more computing resources may be allocated to the system on that future day.

Although patterns may generally exist in times series data, these patterns may occasionally be broken for various reasons, resulting in various anomalies. For example, the number of "like" actions in a social network may unexpectedly drop on a particular day due to a lack of cellular phone reception within a geographical region, preventing users from interacting with the social network on their cellular devices. Similarly, an Internet server or connection may have unexpectedly been unavailable or taken down for service, etc. Thus, an anomaly may cause observations (e.g. actual data) to deviate from predictions. Moreover, an anomaly may affect future predictions due to the time-dependent nature of particular data models, in that a particular model could make a prediction that echoes an anomaly that is unlikely to occur again. Such false predictions may cause an incorrect allocation of computing resources, which may lead to additional system instability or other issues.

BASIC DESCRIPTION OF THE DRAWINGS

The techniques introduced here may be better understood by referring to the following Detailed Description in conjunction with the accompanying drawings, in which like reference numerals indicate identical or functionally similar elements:

Figure 1A:
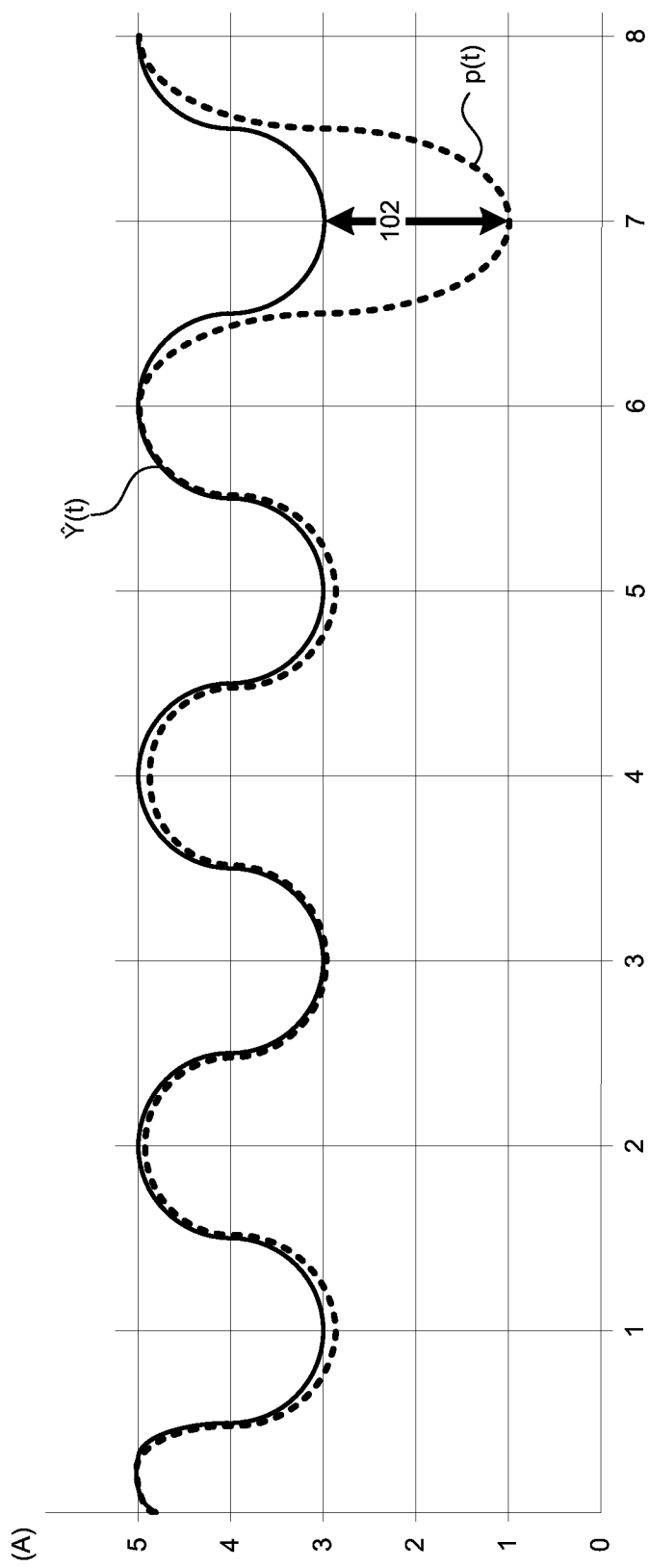
FIGS. 1A and 1B are graph diagrams illustrating an example time series and related data.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Technology is described for detecting and/or correcting for anomalies in time series data. In various embodiments, the technology builds a linear regression model for time series data, computes a prediction for a future time based on the linear regression model, determines whether a prediction error for the prediction is larger than a threshold and, if so, raises an alarm.

In various embodiments, the value of a time series y at a time point t may be modeled as p(t) in terms of historical values x(t) using linear regression analysis with a weight vector was follows:

$$p(t) = w \cdot x(t),$$

$$x(t) = [y(t-1), \ldots, y(t-T)], w = [w_1, \ldots, W_T],$$

where T is typically chosen to be large enough to capture particular time dependencies. Once modeled, p(t) may serve as a prediction of y(t) for a future time t. The least squares approach may be used to estimate the values of weight vector w based on historical values as follows:

$$\text{Min}\left(\sum_i (y(i) - w \cdot x(i))^2\right), \quad (1)$$

where the maximum value of i depends on the amount of past data available. In particular embodiments, the values of weight vector w may be constrained to be non-negative.

Regularization can be applied to the model to help prevent over-fitting. With a first form regularization that limits the $L^2$ norm of w, formula (1) may be modified as follows:

$$\text{Min}\left(a * |w|^2 + \sum_i (y(i) - w \cdot x(i))^2\right).$$

where the value of a is chosen using cross-validation. However, the high likelihood of dependence between randomly chosen validation sets and training sets can tend to lead to an over-fit solution. On the other hand, increasing the value of a often leads to an under-fit solution.

With a second form of regularization that requires all components of w to be non-negative, cross validation is not required, as the second form of regularization is "stronger" than the first form. In addition, when w is expected to be sparse with few non-zero components, the specific implementation, which often leads to a sparse solution and thus runs relatively fast, might be especially appropriate.

Figure 1B:
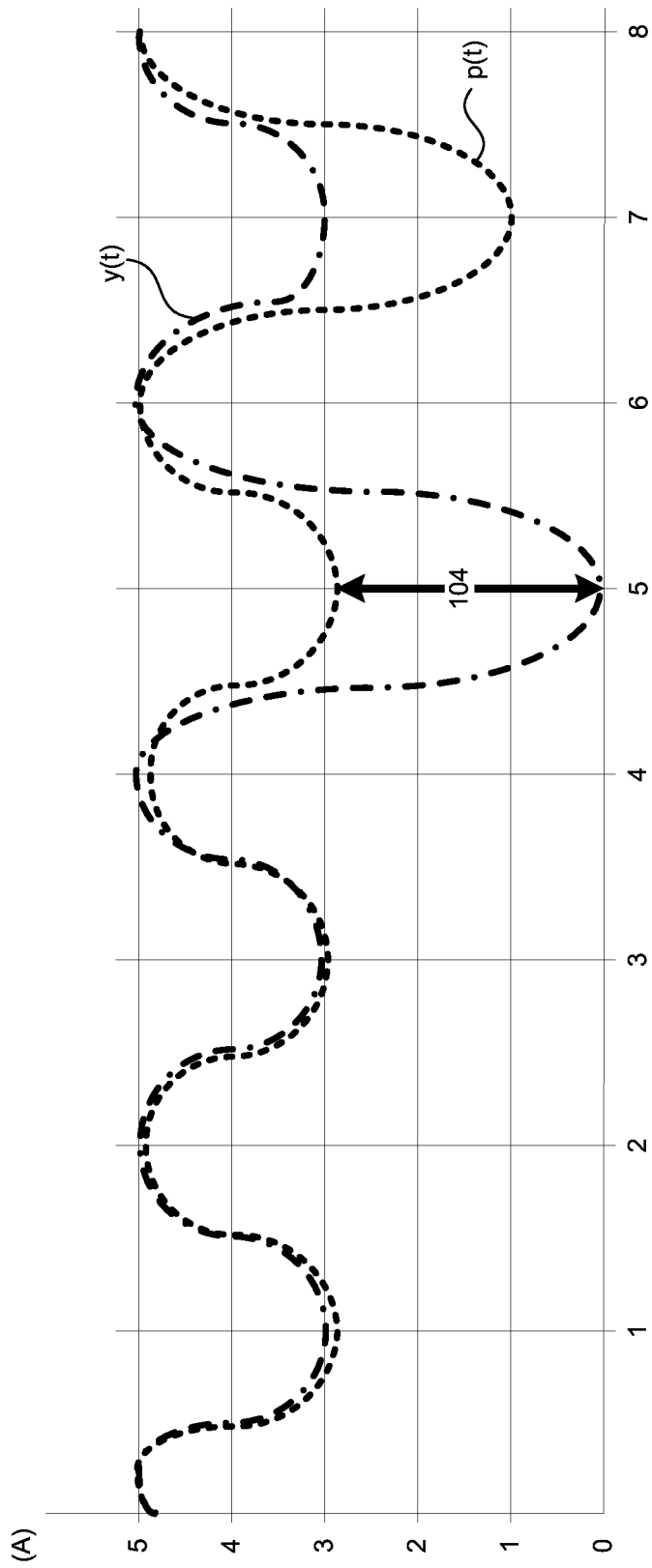

In various embodiments, the prediction p(t) may thus be obtained by enforcing the non-negative constraint to formula (1). FIGS. 1A and 1B are graph diagrams illustrating an example time series and related data. The vertical axis measures counts (e.g., 100's of "likes") and the horizontal axis identifies time, e.g., days. As an example of y(t), FIG. 1A shows an ideal (or "signal") version $\hat{Y}(t)$ of y(t), which is y(t) without anomalies, as well as the prediction p(t) of y(t). In this example, $\hat{Y}(t)$ has a two-day rhythm in that data from two days ago predicts today's data well. FIG. 1B shows y(t) as well as p(t) again for comparison. The difference between the prediction and the time series, p(t)−y(t), is referred to herein as the "prediction error," and the difference between the prediction and the ideal (or "signal") portion, p(t)−$\hat{Y}(t)$, is referred to herein as the "prediction deviation."

In this example, on day 5, an unexpected large drop occurs, as can be seen from y(t) in FIG. 1B compared to $\hat{Y}(t)$ in FIG. 1A, resulting in an anomaly. As mentioned above, an anomaly typically corresponds to a large prediction error. In general, the standard deviation of the prediction error with respect to data in which anomalies have not occurred can be a good measure of uncertainty in the prediction. In this example, the standard deviation of the prediction error with respect to data in which anomalies have not occurred, which is close to zero, may be computed from the data for days 1-4 as shown in FIG. 1B. When the prediction error is substantially larger than the standard deviation, such as greater than five times the standard deviation, an anomaly may be identified with sufficient confidence. In this example, the prediction error at day 5 104 is substantially greater than the aforementioned standard deviation of close to zero as shown in FIG. 1B, and thus an anomaly may be identified for day 5.

However, a large prediction error may not necessarily point to an anomaly. In the illustrated example, the model gives a large weight to data from two days ago in its prediction. As mentioned above, on day 5, a large drop occurs as shown for y(t) in FIGS. 1B and 1s detected as an anomaly. On day 7, even though nothing unusual has happened, the prediction p(t) takes a large dip as shown in FIG. 1B, largely echoing what happened two days earlier and leading to another prediction error 102 that does not correspond to an anomaly in actual data y(t). This subsequent prediction error may not be as large as the initial prediction error in general, as the model may depend on data at multiple past time points and not just the time point including the anomaly.

One approach of dealing with this "echo" problem discussed above, where a model makes a prediction that echoes an anomaly that is unlikely to occur again, is to repair the historical data to replace an anomaly with a prediction. However, an anomaly may be the start of a new trend that should not be ignored, and modeling based on predicted values rather than actual values could lead to accumulated errors. Therefore, in some embodiments, an approach to dealing with the echo problem is to take into consideration the possibility that the prediction p(t) may be poor due to past anomalies and modify the approach of detecting anomalies. Specifically, the time series y may be broken down into the ideal (or "signal") portion $\hat{Y}$ and a noise portion n representing anomalies as follows:

$$y(t)=\hat{Y}(t)+n(t), \text{ with } \hat{X}(t)=[\hat{Y}(t-1), \ldots, \hat{Y}(t-T)]$$

The standard deviation of the prediction deviation when p(t) is affected by anomalies, which is generally greater than the standard deviation of the prediction error in which no anomalies have occurred, may be used instead for detecting anomalies. This approach might work better as it accounts for data variance due to echoing anomalies. By requiring that the prediction error be sufficiently larger than the standard deviation of the prediction deviation when p(t) is affected by anomalies, it is more likely to prevent identifying an echoing anomaly as an anomaly in actual data. As an example, the standard deviation of the prediction deviation when p(t) is affected by anomalies may theoretically be computed from the data for days 4-8 as shown in FIG. 1A.

In some embodiments, the variance of the prediction deviation when p(t) is affected by anomalies may be computed as follows:

$$\text{Var}(p(t)-\hat{Y}(t)) = \text{Var}\left(\left(\sum_{j=1}^{T} w_j * y(t-j)\right) - \hat{Y}(t)\right)$$

$$= \text{Var}\left(\left(\sum_{j=1}^{T} w_j * (\hat{Y}(t-j)+n(t-j))\right) - \hat{Y}(t)\right)$$

Assuming that the noise n is independent of $\hat{Y}$, $$\text{Var}\left(\left(\sum_{j=1}^{T} w_j * (\hat{Y}(t-j)+n(t-j))\right) - \hat{Y}(t)\right) =$$

$$\text{Var}(w \cdot \hat{X}(t) - \hat{Y}(t)) + \text{Var}\left(\sum_{j=1}^{T} w_j * n(t-j)\right) = V + C$$

V would then represent the general uncertainty in the prediction, while C would correspond to additional uncertainty introduced by anomalies, likely causing echoing anomalies. V can be the square of the standard deviation of the prediction error with respect to data in which anomalies have not occurred as discussed above and could be computed from a portion of the time series that is deemed to have no anomalies. If the portion of time series used for this purpose in fact contains anomalies, for instance if the timing of past anomalies is not known, V can still be computed from that portion, usually leading to an only slightly larger number if anomalies are not too frequent. Assuming that n is also independent from one time point to the next, C may be computed as follows:

$$\text{Var}\left(\sum_{j=1}^{T} n(t-j) * w_j\right) = \sum_{j=1}^{T} w_j^2 * \text{Var}(n(t-j))$$

Generally, when the prediction error p(k)−y(k) for time k is much greater than V, the reason could be that y(k) corresponds to an anomaly or p(k) corresponds to an echoing anomaly. Therefore, p(t)−y(t) may be assumed to be drawn from a distribution with variance V+Var(n(t)). To simplify the calculation of Var(n(t)), n(i) and n(j), i≠j, may be considered as distinct random variables, and the prediction errors for different time points may be considered as distinct random variables each having only one value available. V+Var(n(t)) may then be estimated as $(p(t)-y(t))^2$, with the constraint that it must be greater than V.

Therefore, C may be further computed as follows:

$$\sum_{j=1}^{T} w_j^2 * \mathrm{Var}(n(t-j)) = \sum_{j=1}^{T} w_j^2 * (\max(0, ((p(t-j) - y(t-j))^2 - V)))$$

According to the formula above, both the prediction error and the associated weight for a time point should be large to lead to a significant contribution to C. In other words, the additional uncertainty would be significant only when anomalous historical data falls on regions of large weights.

Figure 2:
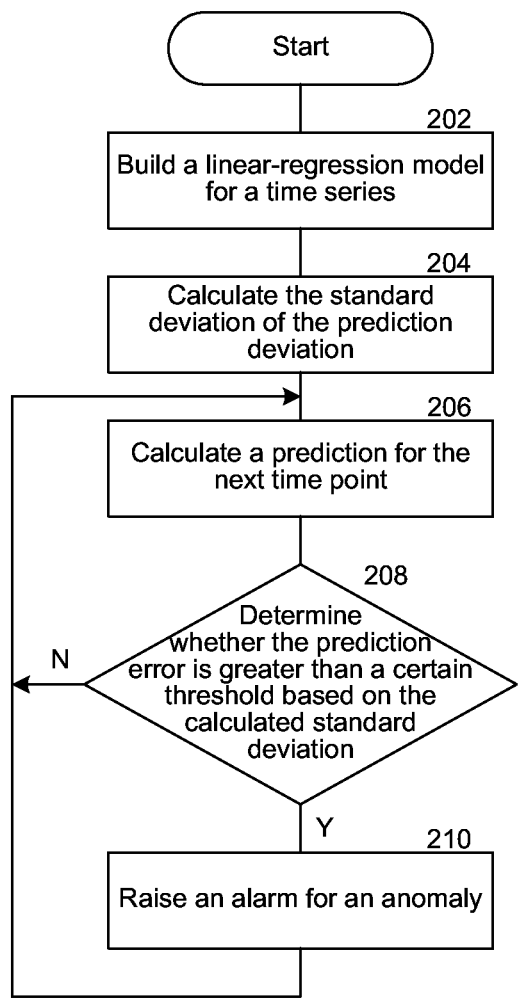
FIG. 2 is a flow diagram illustrating an example process for detecting an anomaly.

FIG. 2 is a flow diagram summarizing an example process for detecting an anomaly with respect to V+C. At block 202, a linear-regression model is built for a time series. As discussed above, the non-negative form of regularization may be applied in fitting the model. At block 204, the variance and standard deviation of the prediction deviation is calculated. At this point, a threshold may be determined based on the calculated standard deviation, such as five times the calculated standard deviation. From then on, the model and the calculated standard deviation can be used for detecting anomalies at every time point. At block 206, a prediction for the next time point is calculated using the linear-regression model. At block 208, whether the prediction error is bigger than the predetermined threshold is determined. When the determination result is positive, at block 210, an alarm is raised for a potential anomaly. When the prediction error is due to an echoing anomaly and thus is not as large as a real anomaly, however, the threshold may prevent an alarm from being raised. The model may be updated at various times, such as periodically or after a specified number of anomalies occur.

Those skilled in the art will appreciate that the logic illustrated in FIG. 2 and described above, and in each of the flow diagrams discussed below, may be altered in various ways. For example, the order of the logic may be rearranged, substeps may be performed in parallel, illustrated logic may be omitted, other logic may be included, etc.

Figure 3:
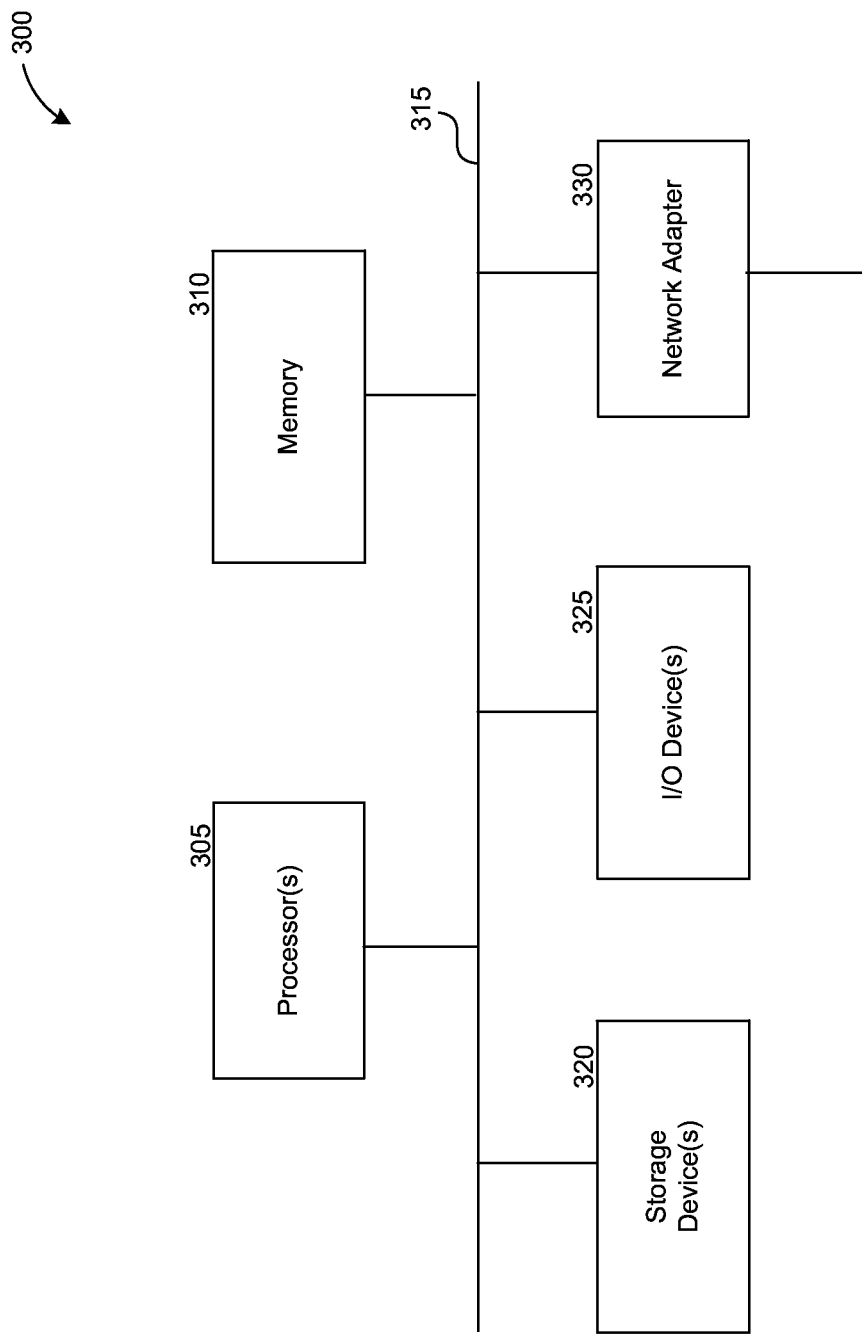
FIG. 3 is a block diagram illustrating example components of a computer system that may be used to implement various features of the disclosed embodiments.

FIG. 3 is a block diagram illustrating example components of a computer system that may be used to implement various features of the embodiments. The computing system 300 may include one or more central processing units ("processors") 305, memory 310, input/output devices 325 (e.g., keyboard and pointing devices, display devices), storage devices 320 (e.g., disk drives), and network adapters 330 (e.g., network interfaces) that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called "Firewire".

The memory 310 and storage devices 320 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 310 can be implemented as software and/or firmware to program the processor(s) 305 to carry out actions described above. In some embodiments, such software or firmware may be initially provided to the processing system 300 by downloading it from a remote system through the computing system 300 (e.g., via network adapter 330).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

In various embodiments, the disclosed technology implements a method of detecting anomalies in time series data, comprising: modeling a time series using a linear regression framework; representing the time series as a sum of a signal portion and a noise, wherein the signal portion corresponds to time-dependent data, and the noise removes time dependence from the data; calculating, for a specified time, a variance of a difference between a value of the time series predicted by the linear regression framework and a value of the signal portion; determining a threshold based on the calculated variance; and raising an alarm when a difference between a value of the time series predicted by the linear regression framework and an observed value of the time series for the specified time is larger than the threshold. The modeling can include fitting the linear regression framework using a least squares approach with a non-negative form of regularization. The method can include calculating includes deriving the variance as a sum of a first variance of a difference between a value of the signal portion and a value of the signal portion estimated by the linear regression framework for the time point, and a second variance. The first variance can be estimated from values of the time series determined to contain no anomalies. The linear regression framework can be defined by a plurality of weights respectively associated with a plurality of past time periods, and the second variance can be estimated as a sum of, over a plurality of time periods, a product of, a square of the weight and a difference of, a square of, a difference between a value of the time series estimated by the linear regression framework and a value of the time series, and the first variance, for each of the time periods. The determined threshold can be five times the square root of the calculated variance.

In various embodiments, the technology can include a computer-readable storage medium storing computer-executable instructions that, when executed, cause a computer to perform a method of detecting anomalies in time series data, comprising: instructions for modeling a time series using a linear regression framework; instructions for representing the time series as a sum of a signal portion and a noise, wherein the signal portion corresponds to time-dependent data, and the noise removes time dependence from the data; instructions for calculating, for a specified time, a variance of a difference between a value of the time series predicted by the linear regression framework and a value of the signal portion; instructions for determining a threshold based on the calculated variance; and instructions for raising an alarm when a difference between a value of the time series predicted by the linear regression framework and an observed value of the specified time is larger than the threshold.

In various embodiments, the technology implements a system for detecting anomalies in time series data, comprising: a modeling component configured to model a time series using a linear regression framework; a representing component configured to represent the time series as a sum of a signal portion and a noise, wherein the signal portion corresponds to time-dependent data, and the noise takes the data out of time dependence; a calculating component configured to calculate a variance of a difference between a value of the time series estimated by the linear regression framework and a value of the signal portion for a time point; a determining component configured to determine a threshold based on the calculated variance; and an alarm component configured to raise an alarm when a difference between a value of the time series estimated by the linear regression framework and an observed value of the time series for a time point is greater than the threshold.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example, by using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage," and that the terms may on occasion be used interchangeably.

Consequently, alternative language and synonyms may be used for any one or more of the terms discussed herein nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method of detecting anomalies in time series data, comprising:
    modeling, by a computing device having a processor and a memory, a time series using a linear regression framework;
    representing, by the processor, the time series as a sum of a signal portion and a noise, wherein the signal portion corresponds to time-dependent data, and the noise removes time dependence from the data;
    calculating, by the processor, for a specified time, a variance of a difference between a value of the time series predicted by the linear regression framework and a value of the signal portion;
    determining, by the processor, a threshold based on the calculated variance; and
    raising, by the processor, an alarm when a difference between a value of the time series predicted by the linear regression framework and an observed value of the time series for the specified time is larger than the threshold; and
    allocating computing resources to process a workload based on the time series predicted by the linear regression framework, wherein the allocating includes:
        identifying those anomalies in which the difference between the value of the time series predicted by the linear regression framework and the observed value of the time series is below the threshold as echoing anomalies, and
        preventing, from being considered for allocating the computing resources, the echoing anomalies in the time series predicted by the linear regression framework.

2. The computer-implemented method of claim 1, wherein the modeling includes fitting the linear regression framework using a least squares approach with a non-negative form of regularization.

3. The computer-implemented method of claim 1, wherein the calculating includes deriving the variance as a sum of a first variance of a difference between a value of the signal portion and a value of the signal portion estimated by the linear regression framework for the time point, and a second variance.

4. The computer-implemented method of claim 3, wherein the first variance is estimated from values of the time series determined to contain no anomalies.

5. The computer-implemented method of claim 3, wherein
    the linear regression framework is defined by a plurality of weights respectively associated with a plurality of past time periods, and
    the second variance is estimated as a sum of, over a plurality of time periods, a product of, a square of the weight and a difference of, a square of, a difference between a value of the time series estimated by the linear regression framework and a value of the time series, and the first variance, for each of the time periods.

6. The computer-implemented method of claim 1, wherein the determined threshold is five times the square root of the calculated variance.

7. A non-transitory computer-readable storage medium storing computer-executable instructions that, when executed, cause a computer to perform a method of detecting anomalies in time series data, comprising:
instructions for modeling a time series using a linear regression framework;
instructions for representing the time series as a sum of a signal portion and a noise, wherein the signal portion corresponds to time-dependent data, and the noise removes time dependence from the data;
instructions for calculating, for a specified time, a variance of a difference between a value of the time series predicted by the linear regression framework and a value of the signal portion;
instructions for determining a threshold based on the calculated variance; and
instructions for raising an alarm when a difference between a value of the time series predicted by the linear regression framework and an observed value of the specified time is larger than the threshold; and
instructions for allocating computing resources to process a workload based on the time series predicted by the linear regression framework, wherein the allocating includes:
identifying those anomalies in which the difference between the value of the time series predicted by the linear regression framework and the observed value of the time series is below the threshold as echoing anomalies, and
preventing, from being considered for allocating the computing resources, the echoing anomalies in the time series predicted by the linear regression framework.

8. The non-transitory computer-readable storage medium of claim 7, wherein the instructions for modeling include instructions for fitting the linear regression framework using a least squares approach with a non-negative form of regularization.

9. The non-transitory computer-readable storage medium of claim 7, wherein the instructions for calculating include instructions for deriving the variance as a sum of a first variance of a difference between a value of the signal portion and a value of the signal portion predicted by the linear regression framework for the specified time, and a second variance.

10. The non-transitory computer-readable storage medium of claim 9, wherein the first variance is estimated from values of the time series determined to contain no anomalies.

11. The non-transitory computer-readable storage medium of claim 9, wherein
the linear regression framework is defined by multiple weights respectively associated with multiple past time periods, and
the second variance is estimated as a sum of, over multiple time periods, a product of, a square of the weight and a difference of, a square of, a difference between a value of the time series estimated by the linear regression framework and a value of the time series, and the first variance, for each of the time periods.

12. The non-transitory computer-readable storage medium of claim 7, wherein the determined threshold is five times the square root of the calculated variance.

13. A system for detecting anomalies in time series data, comprising:
a modeling component configured to model a time series using a linear regression framework;
a representing component configured to represent the time series as a sum of a signal portion and a noise, wherein the signal portion corresponds to time-dependent data, and the noise takes the data out of time dependence;
a calculating component configured to calculate a variance of a difference between a value of the time series estimated by the linear regression framework and a value of the signal portion for a time point;
a determining component configured to determine a threshold based on the calculated variance; and
an alarm component configured to raise an alarm when a difference between a value of the time series estimated by the linear regression framework and a observed value of the time series for a time point is greater than the threshold, wherein the system is further configured to allocate computing resources to process a workload based on the time series predicted by the linear regression framework, wherein the allocating includes:
identifying those anomalies in which the difference between a value of the time series predicted by the linear regression framework and the observed value of the time series is below the threshold as echoing anomalies, and
preventing, from being considered for allocating the computing resources, the echoing anomalies in the time series predicted by the linear regression framework.

14. The system of claim 13, wherein the modeling component is further configured to model the linear regression framework using a least squares approach with a non-negative form of regularization.

15. The system of claim 13, wherein the calculating component is further configured to derive the variance as a sum of a first variance of a difference between a value of the signal portion and a value of the signal portion estimated by the linear regression framework for the time point, and a second variance.

16. The system of claim 15, wherein the first variance is estimated from values of the time series determined to contain no anomalies.

17. The system of claim 15, wherein
the linear regression framework is defined by a plurality of weights respectively associated with a plurality of past time periods, and
the second variance is estimated as a sum of, over a plurality of time periods, a product of, a square of the weight and a difference of, a square of, a difference between a value of the time series estimated by the linear regression framework and a value of the time series, and the first variance, for each of the time periods.

18. The system of claim 13, wherein the determined threshold is five times the square root of the calculated variance.

* * * * *